US010320286B2

(12) United States Patent
Cao

(10) Patent No.: US 10,320,286 B2
(45) Date of Patent: Jun. 11, 2019

(54) ABSORPTION CIRCUIT, FEED CIRCUIT AND LIQUID CRYSTAL DISPLAY

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 338 days.

(21) Appl. No.: 15/327,612

(22) PCT Filed: Dec. 22, 2016

(86) PCT No.: PCT/CN2016/111462
§ 371 (c)(1),
(2) Date: Jan. 19, 2017

(87) PCT Pub. No.: WO2018/053960
PCT Pub. Date: Mar. 29, 2018

(65) Prior Publication Data
US 2018/0219475 A1 Aug. 2, 2018

(30) Foreign Application Priority Data
Sep. 20, 2016 (CN) .......................... 2016 1 0836167

(51) Int. Cl.
*H02M 1/44* (2007.01)
*G09G 3/36* (2006.01)
(Continued)

(52) U.S. Cl.
CPC ................ *H02M 1/44* (2013.01); *G09G 3/20* (2013.01); *G09G 3/36* (2013.01); *H02M 3/145* (2013.01);
(Continued)

(58) Field of Classification Search
CPC ........ H02M 1/44; H02M 3/145; H02M 3/155; H02M 3/157; H02M 3/335; H02M 3/285;
(Continued)

(56) References Cited

U.S. PATENT DOCUMENTS 6,088,247 A 7/2000 Cheng
7,236,060 B2 * 6/2007 Wood .................. H03B 5/1852
327/291
(Continued)

FOREIGN PATENT DOCUMENTS

CN 102647077 A 8/2012
CN 102904453 A 1/2013
(Continued)

*Primary Examiner* — Adolf D Berhane
(74) *Attorney, Agent, or Firm* — Andrew C. Cheng

(57) ABSTRACT

The absorption circuit of the present invention is applied in a feed circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage. Therefore, the present invention can control the resistor and the capacitor coupled to the transformer according to the leakage inductance (i.e. the voltage) of the transformer, and then to adaptively restrain the corresponding voltage peak and EMI.

12 Claims, 2 Drawing Sheets

(51) Int. Cl.
*H02M 3/145* (2006.01)
*H02M 3/335* (2006.01)
*G09G 3/20* (2006.01)
*H02M 1/00* (2006.01)
*H02M 1/34* (2007.01)

(52) U.S. Cl.
CPC ........ *H02M 3/335* (2013.01); *G09G 2330/02* (2013.01); *G09G 2330/021* (2013.01); *G09G 2330/06* (2013.01); *H02M 2001/0038* (2013.01); *H02M 2001/0048* (2013.01); *H02M 2001/0064* (2013.01); *H02M 2001/344* (2013.01); *H02M 2001/348* (2013.01)

(58) Field of Classification Search
CPC ............... H02M 3/315; H02M 3/3155; H02M 2001/0038; H02M 2001/0048; H02M 2001/0064; H02M 2001/344; H02M 2001/348; G09G 2330/02
See application file for complete search history.

(56) References Cited

U.S. PATENT DOCUMENTS

| | | |
|---|---|---|
| 2013/0049654 A1 | 2/2013 | Kure |
| 2014/0160805 A1* | 6/2014 | Oh .................... H02M 3/33507 363/21.02 |
| 2015/0381056 A1* | 12/2015 | Hayakawa ........... H03K 17/164 363/21.15 |
| 2016/0241145 A1* | 8/2016 | Matsuura ............... H02M 3/156 |
| 2017/0033707 A1* | 2/2017 | Nishijima ............... H02M 7/06 |
| 2018/0175729 A1* | 6/2018 | Cao ...................... H02H 7/1213 |
| 2018/0183324 A1* | 6/2018 | Cao ......................... H02M 1/00 |

FOREIGN PATENT DOCUMENTS

| | | |
|---|---|---|
| CN | 103780065 | 5/2014 |
| CN | 103812317 A | 5/2014 |
| CN | 104009643 A | 8/2014 |
| CN | 104242656 A | 12/2014 |
| CN | 104426344 A | 3/2015 |
| CN | 105207481 A | 12/2015 |
| CN | 105515361 A | 4/2016 |
| EP | 2525480 A1 | 11/2012 |
| JP | S5720631 B2 | 4/1982 |

* cited by examiner

ABSORPTION CIRCUIT, FEED CIRCUIT AND LIQUID CRYSTAL DISPLAY

CROSS REFERENCE

This application claims the priority of Chinese Patent Application No. 201610836167.0, entitled "Absorption circuit, feed circuit and liquid crystal display", filed on Sep. 20, 2016, the disclosure of which is incorporated herein by reference in its entirety.

FIELD OF THE INVENTION

The present invention relates to a display technical field, and more particularly to a voltage output control circuit and a liquid crystal display.

BACKGROUND OF THE INVENTION

The feed circuit structure according to prior art is to restrain the issues of the voltage peak and EMI caused by the leakage inductance of the transformer, and an absorption circuit is coupled in parallel between the primary levels of the transformer. In these solutions, the issues of the voltage peak and EMI caused by the leakage inductance of the transformer can be restrained with a certain level. However, the leakage inductance difference of the batches of the transformers might be larger, and it results appearance of shift for issues of the voltage peaks and EMIs caused by the leakage inductances of the transformers of different batches, and cannot realize the best result.

SUMMARY OF THE INVENTION

An objective of the present invention is to provide an absorption circuit, to be applied for transformers of different batches to restrain the voltage peak and EMI caused by the leakage inductance of the corresponding transformer.

Another objective of the present invention is to provide a feed circuit.

For realizing the aforesaid objective, the technical solution provided by the embodiments of the present invention is:

The present invention provides an absorption circuit, applied in a feed circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage.

The comparison unit comprises a first comparator, a second comparator, a first electric switch and a first resistor, and a non inverting input terminal of the first comparator is coupled to the transformer primary dotted terminal to receive the voltage, and an inverting input terminal of the first comparator receives the first preset voltage, and an output terminal of the first comparator is coupled to the regulation circuit, and a non inverting input terminal of the second comparator receives the second preset voltage, and an inverting input terminal of the second comparator is coupled to the transformer primary dotted terminal to receive the voltage, and an output terminal of the second comparator is coupled to a control terminal of the first electrical switch, and a first terminal of the first electrical switch is coupled to a voltage terminal through the first resistor and coupled to the regulation unit, and a second terminal of the first electrical switch is grounded.

The regulation unit comprises a second electrical switch, a third electrical switch, a fourth electrical switch, a fifth electrical switch, a second resistor, a third resistor, a fourth resistor, a first capacitor, a second capacitor, a third capacitor, and a diode, a control terminal of the second electrical switch is coupled to an output terminal of the first comparator, and a first terminal of the second electrical switch is coupled to a transformer primary homonymous terminal through the second resistor, and a second terminal of the second electrical switch is coupled to a cathode of the diode, and an anode of the diode is coupled to the transformer primary dotted terminal, and a control end of the third electrical switch is coupled to the first terminal of the first electrical switch, and a first terminal of the third electrical switch is coupled to the transformer primary homonymous terminal, and is also coupled to the cathode of the diode through the third resistor, and a second terminal of the third electrical switch is coupled to the cathode of the diode, and a control terminal of the fourth electrical switch is coupled to the output terminal of the first comparator, and a first terminal of the fourth electrical switch is coupled to the transformer primary homonymous terminal through the first capacitor, and a second terminal of the fourth electrical switch is coupled to the cathode of the diode, and a control terminal of the fifth electrical switch is coupled to the first terminal of the first electrical switch, and a first terminal of the fifth electrical switch is coupled to the transformer primary homonymous terminal through the second capacitor, and is also coupled to the cathode of the diode through the third capacitor, and a second terminal of the fifth electrical switch is coupled to the cathode of the diode.

The first electrical switch to the fifth electrical switch are NPN type field effect transistors, and control terminals, first terminals and second terminals of the first electrical switch to the fifth electrical switch respectively are gates, drains and sources of the field effect transistors.

The present invention provides a feed circuit, comprising a transformer and an absorption circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage.

The comparison unit comprises a first comparator, a second comparator, a first electric switch and a first resistor, and a non inverting input terminal of the first comparator is coupled to the transformer primary dotted terminal to receive the voltage, and an inverting input terminal of the first comparator receives the first preset voltage, and an output terminal of the first comparator is coupled to the regulation circuit, and a non inverting input terminal of the second comparator receives the second preset voltage, and an inverting input terminal of the second comparator is coupled to the transformer primary dotted terminal to receive the voltage, and an output terminal of the second comparator is coupled to a control terminal of the first electrical switch, and a first terminal of the first electrical switch is coupled to a voltage terminal through the first resistor and coupled to the regulation unit, and a second terminal of the first electrical switch is grounded.

The regulation unit comprises a second electrical switch, a third electrical switch, a fourth electrical switch, a fifth electrical switch, a second resistor, a third resistor, a fourth resistor, a first capacitor, a second capacitor, a third capacitor, and a diode, a control terminal of the second electrical switch is coupled to an output terminal of the first comparator, and a first terminal of the second electrical switch is coupled to a transformer primary homonymous terminal through the second resistor, and a second terminal of the second electrical switch is coupled to a cathode of the diode, and an anode of the diode is coupled to the transformer primary dotted terminal, and a control end of the third electrical switch is coupled to the first terminal of the first electrical switch, and a first terminal of the third electrical switch is coupled to the transformer primary homonymous terminal, and is also coupled to the cathode of the diode through the third resistor, and a second terminal of the third electrical switch is coupled to the cathode of the diode, and a control terminal of the fourth electrical switch is coupled to the output terminal of the first comparator, and a first terminal of the fourth electrical switch is coupled to the transformer primary homonymous terminal through the first capacitor, and a second terminal of the fourth electrical switch is coupled to the cathode of the diode, and a control terminal of the fifth electrical switch is coupled to the first terminal of the first electrical switch, and a first terminal of the fifth electrical switch is coupled to the transformer primary homonymous terminal through the second capacitor, and is also coupled to the cathode of the diode through the third capacitor, and a second terminal of the fifth electrical switch is coupled to the cathode of the diode.

The first electrical switch to the fifth electrical switch are NPN type field effect transistors, and control terminals, first terminals and second terminals of the first electrical switch to the fifth electrical switch respectively are gates, drains and sources of the field effect transistors.

The present invention provides a display device, comprising a display unit and the aforesaid feed circuit. The feed circuit supplies power for the display unit.

The embodiments of the present invention have advantages or benefits:

The absorption circuit of the present invention is applied in a feed circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage. Therefore, the present invention can control the resistor and the capacitor coupled to the transformer according to the leakage inductance (i.e. the voltage) of the transformer, and then adaptively restrains the corresponding voltage peak and EMI.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

Figure 1:
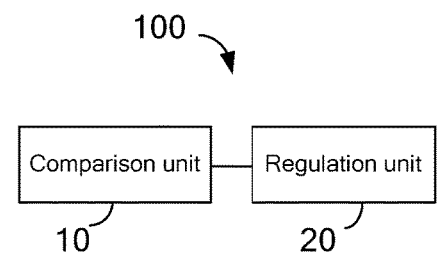
FIG. 1 is a block diagram of an absorption circuit provided by the first solution of the present invention.

Please refer to FIG. 1, which is an absorption circuit 100 provided by the first solution of the present invention. The absorption circuit 100 is applied in a feed circuit. The absorption circuit 100 comprises a comparison unit 10 and a regulation unit 20, and the comparison unit 10 is employed to receive a voltage of a transformer primary dotted terminal of the feed circuit, and to compare the voltage with a first preset voltage and a second preset voltage and to output a comparison result, and the regulation unit 20 is employed to regulate a resistor and a capacitor coupled to the transformer according to the comparison result, wherein the first preset voltage is larger than the second preset voltage.

Specifically, the comparison unit 10 compares the voltage with the first preset voltage and the second preset voltage, and three comparison results will appear. The first comparison result is that the voltage is larger than the first preset voltage, and the second comparison result is that the voltage is smaller than the second preset voltage, and the third comparison result is that the voltage is larger than the second preset voltage and smaller than the first preset voltage. The regulation unit 20 regulates three kinds of different resistors and capacitors to be coupled to the transformer according to the first comparison result to the third comparison result, and thus can control the resistor and the capacitor coupled to the transformer according to the leakage inductance (i.e. the voltage) of the transformer, and then adaptively restrain the corresponding voltage peak and EMI (Electro-Magnetic Interference).

Figure 2:
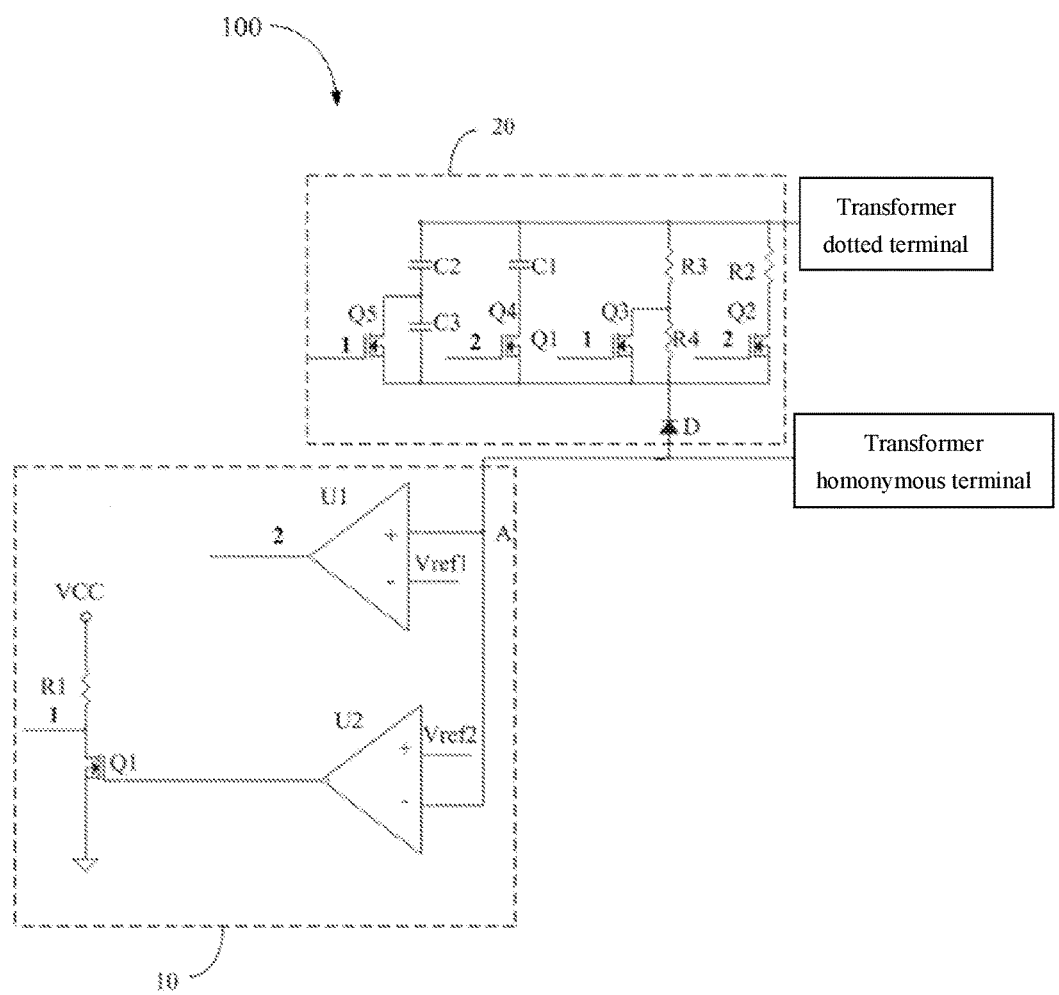
FIG. 2 is a circuit diagram of FIG. 1.

Please refer to FIG. 2. Specifically, the comparison unit 10 comprises a first comparator U1, a second comparator U2, a first electric switch Q1 and a first resistor R1, and a non inverting input terminal of the first comparator U1 is coupled to the transformer primary dotted terminal to receive the voltage VA, and an inverting input terminal of the first comparator U1 receives the first preset voltage Vref1, and an output terminal of the first comparator U1 is coupled to the regulation circuit 20, and a non inverting input terminal of the second comparator U2 receives the second preset voltage Vref2, and an inverting input terminal of the second comparator U2 is coupled to the transformer primary dotted terminal to receive the voltage VA, and an output terminal of the second comparator U2 is coupled to a control terminal of the first electrical switch Q1, and a first terminal of the first electrical switch Q1 is coupled to a voltage terminal VCC through the first resistor R1 and coupled to the regulation unit 20, and a second terminal of the first electrical switch Q1 is grounded.

The regulation unit 20 comprises a second electrical switch Q2, a third electrical switch Q3, a fourth electrical switch Q4, a fifth electrical switch Q5, a second resistor R2, a third resistor R3, a fourth resistor R4, a first capacitor C1, a second capacitor C2, a third capacitor C3, and a diode D, a control terminal of the second electrical switch Q2 is coupled to an output terminal of the first comparator U1, and a first terminal of the second electrical switch Q2 is coupled to a transformer primary homonymous terminal through the second resistor R2, and a second terminal of the second electrical switch Q2 is coupled to a cathode of the diode D, and an anode of the diode D is coupled to the transformer primary dotted terminal, and a control end of the third electrical switch Q3 is coupled to the first terminal of the first electrical switch Q1, and a first terminal of the third electrical switch Q3 is coupled to the transformer primary homonymous terminal, and is also coupled to the cathode of the diode D through the third resistor R3, and a second terminal of the third electrical switch Q3 is coupled to the cathode of the diode D, and a control terminal of the fourth electrical switch Q4 is coupled to the output terminal of the first comparator, and a first terminal of the fourth electrical switch Q4 is coupled to the transformer primary homonymous terminal through the first capacitor C1, and a second terminal of the fourth electrical switch Q4 is coupled to the cathode of the diode D, and a control terminal of the fifth electrical switch Q5 is coupled to the first terminal of the first electrical switch Q1, and a first terminal of the fifth electrical switch Q5 is coupled to the transformer primary homonymous terminal through the second capacitor C2, and is also coupled to the cathode of the diode D through the third capacitor C3, and a second terminal of the fifth electrical switch Q5 is coupled to the cathode of the diode D.

Specifically, the voltage of the transformer primary dotted terminal, i.e. the voltage of the A point (the voltage VA) is detected, the larger the leakage inductance of the transformer is, the higher the voltage of the A point becomes, and the EMI result is worse.

As VA>Vref1, the leakage inductance gets large, and the first comparator U1 outputs high voltage level, and the second comparator U2 outputs a low voltage level signal. The second electrical switch to the fifth electrical switch Q2-Q5 are all on, and the resistor coupled to the transformer R=R1/R2 (the first resistor R1 and the second resistor R2 are coupled in parallel), and the capacitor coupled to the transformer C=C1/C2 (the first capacitor C1 and the second capacitor C2 are coupled in parallel). Thus, the capacitor C coupled to the transformer is the largest, and the resistor R coupled to the transformer is the smallest. Thus, the absorption capability of the absorption circuit 100 becomes stronger. Namely, as long with the increase of the leakage inductance of the transformer, the absorption capability of the absorption circuit 100 corresponding gets strong.

As Vref2<VA<Vref1, the leakage inductance is in a normal range, and the first comparator U1 outputs low voltage level, and the second comparator U2 outputs a low voltage level signal. The second electrical switch Q2 and the fourth electrical switch Q4 are off, and the third electrical switch Q3 and the fifth electrical switch Q5 are on, and then the resistor coupled to the transformer R=R2, and the capacitor coupled to the transformer C=C2. Thus, both the capacitor C coupled to the transformer and the resistor R coupled to the transformer are kept to be the original actual values.

As VA<Vref2, the leakage inductance gets small, and the first comparator U1 outputs low voltage level, and the second comparator U2 outputs a high voltage level signal. The second electrical switch to the fifth electrical switch Q2-Q5 are all off, and the resistor coupled to the transformer R=R2 and R3 coupled in series, and the capacitor coupled to the transformer C=C2 and C3 coupled in series. Therefore, the capacitor C coupled to the transformer is the smallest, and the resistor R coupled to the transformer is the largest. Thus, the absorption capability of the absorption circuit 100 becomes weak. Along with the decrease of the leakage inductance of the transformer, the absorption capability of the absorption circuit 100 corresponding gets weak to reduce the loss and promote the efficiency while ensuring to restrain the voltage peak.

In this embodiment, the absorption circuit 100 correspondingly regulates the absorption capability by detecting the voltage of the transformer primary dotted terminal so that the voltage peak reach the smallest, and the EMI result is the best, and the loss of the feed circuit can be decreased.

In this embodiment, the first electrical switch to the fifth electrical switch Q1-Q5 are NPN type field effect transistors, and control terminals, first terminals and second terminals of the first electrical switch to the fifth electrical switch Q1-Q5 respectively are gates, drains and sources of the field effect transistors. In other embodiments, the first electrical switch to the fifth electrical switch Q1-Q5 also can be transistors of other types.

Figure 3:
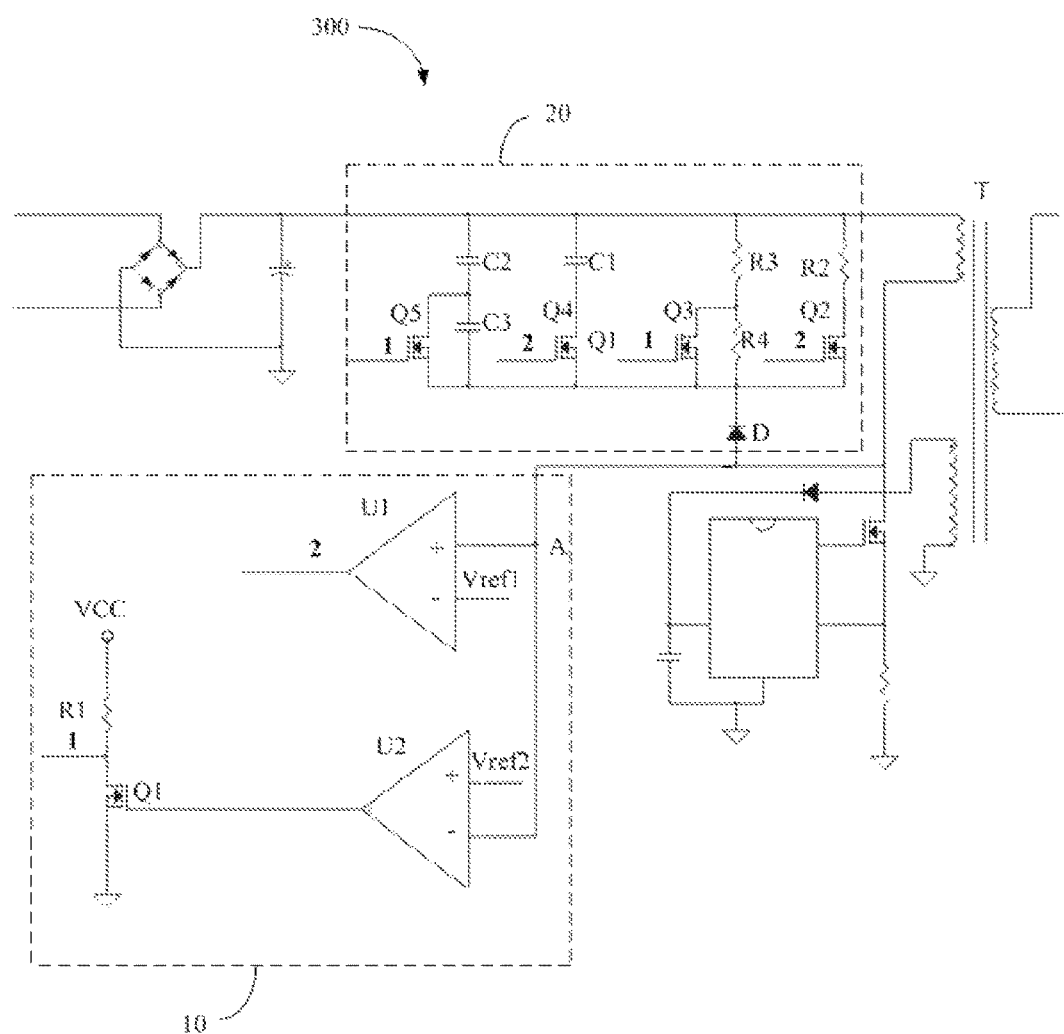
FIG. 3 is a circuit diagram of a feed circuit provided by the second solution of the present invention.

Please refer to FIG. 3, which is a feed circuit 300 provided by the second solution of the present invention. The feed circuit 300 comprises a transformer T and the absorption circuit. The absorption is the absorption circuit 100 provided in the aforesaid first solution. The specification is:

The absorption circuit 100 is applied in a feed circuit. The absorption circuit 100 comprises a comparison unit 10 and a regulation unit 20, and the comparison unit 10 is employed to receive a voltage of a transformer primary dotted terminal of the feed circuit, and to compare the voltage with a first preset voltage and a second preset voltage and to output a comparison result, and the regulation unit 20 is employed to regulate a resistor and a capacitor coupled to the transformer according to the comparison result, wherein the first preset voltage is larger than the second preset voltage.

Specifically, the comparison unit 10 compares the voltage with the first preset voltage and the second preset voltage, and three comparison results will appear. The first comparison result is that the voltage is larger than the first preset voltage, and the second comparison result is that the voltage is smaller than the second preset voltage, and the third comparison result is that the voltage is larger than the second preset voltage and smaller than the first preset voltage. The regulation unit 20 regulates three kinds of different resistors and capacitors to be coupled to the transformer according to the first comparison result to the third comparison result, and thus can control the resistor and the capacitor coupled to the transformer according to the leakage inductance (i.e. the voltage) of the transformer, and then adaptively restrain the corresponding voltage peak and EMI (Electro-Magnetic Interference).

Specifically, the comparison unit 10 comprises a first comparator U1, a second comparator U2, a first electric switch Q1 and a first resistor R1, and a non inverting input terminal of the first comparator U1 is coupled to the transformer primary dotted terminal to receive the voltage VA, and an inverting input terminal of the first comparator U1 receives the first preset voltage Vref1, and an output terminal of the first comparator U1 is coupled to the regulation circuit 20, and a non inverting input terminal of the second comparator U2 receives the second preset voltage Vref2, and an inverting input terminal of the second comparator U2 is coupled to the transformer primary dotted terminal to receive the voltage VA, and an output terminal of the second comparator U2 is coupled to a control terminal of the first electrical switch Q1, and a first terminal of the first electrical switch Q1 is coupled to a voltage terminal VCC through the first resistor R1 and coupled to the regulation unit 20, and a second terminal of the first electrical switch Q1 is grounded.

The regulation unit 20 comprises a second electrical switch Q2, a third electrical switch Q3, a fourth electrical switch Q4, a fifth electrical switch Q5, a second resistor R2, a third resistor R3, a fourth resistor R4, a first capacitor C1, a second capacitor C2, a third capacitor C3, and a diode D, a control terminal of the second electrical switch Q2 is coupled to an output terminal of the first comparator U1, and a first terminal of the second electrical switch Q2 is coupled to a transformer primary homonymous terminal through the second resistor R2, and a second terminal of the second electrical switch Q2 is coupled to a cathode of the diode D, and an anode of the diode D is coupled to the transformer primary dotted terminal, and a control end of the third electrical switch Q3 is coupled to the first terminal of the first electrical switch Q1, and a first terminal of the third electrical switch Q3 is coupled to the transformer primary homonymous terminal, and is also coupled to the cathode of the diode D through the third resistor R3, and a second terminal of the third electrical switch Q3 is coupled to the cathode of the diode D, and a control terminal of the fourth electrical switch Q4 is coupled to the output terminal of the first comparator, and a first terminal of the fourth electrical switch Q4 is coupled to the transformer primary homonymous terminal through the first capacitor C1, and a second terminal of the fourth electrical switch Q4 is coupled to the cathode of the diode D, and a control terminal of the fifth electrical switch Q5 is coupled to the first terminal of the first electrical switch Q1, and a first terminal of the fifth electrical switch Q5 is coupled to the transformer primary homonymous terminal through the second capacitor C2, and is also coupled to the cathode of the diode D through the third capacitor C3, and a second terminal of the fifth electrical switch Q5 is coupled to the cathode of the diode D.

Specifically, the voltage of the transformer primary dotted terminal, i.e. the voltage of the A point (the voltage VA) is detected, the larger the leakage inductance of the transformer is, the higher the voltage of the A point becomes, and the EMI result is worse.

As VA>Vref1, the leakage inductance gets large, and the first comparator U1 outputs high voltage level, and the second comparator U2 outputs a low voltage level signal. The second electrical switch to the fifth electrical switch Q2-Q5 are all on, and the resistor coupled to the transformer R=R1/R2 (the first resistor R1 and the second resistor R2 are coupled in parallel), and the capacitor coupled to the transformer C=C1/C2 (the first capacitor C1 and the second capacitor C2 are coupled in parallel). Thus, the capacitor C coupled to the transformer is the largest, and the resistor R coupled to the transformer is the smallest. Thus, the absorption capability of the absorption circuit 100 becomes stronger. Namely, as long with the increase of the leakage inductance of the transformer, the absorption capability of the absorption circuit 100 corresponding gets strong.

As Vref2<VA<Vref1, the leakage inductance is in a normal range, and the first comparator U1 outputs low voltage level, and the second comparator U2 outputs a low voltage level signal. The second electrical switch Q2 and the fourth electrical switch Q4 are off, and the third electrical switch Q3 and the fifth electrical switch Q5 are on, and then the resistor coupled to the transformer R=R2, and the capacitor coupled to the transformer C=C2. Thus, both the capacitor C coupled to the transformer and the resistor R coupled to the transformer are kept to be the original actual values.

As VA<Vref2, the leakage inductance gets small, and the first comparator U1 outputs low voltage level, and the second comparator U2 outputs a high voltage level signal. The second electrical switch to the fifth electrical switch Q2-Q5 are all off, and the resistor coupled to the transformer R=R2 and R3 coupled in series, and the capacitor coupled to the transformer C=C2 and C3 coupled in series. Therefore, the capacitor C coupled to the transformer is the smallest, and the resistor R coupled to the transformer is the largest. Thus, the absorption capability of the absorption circuit 100 becomes weak. Along with the decrease of the leakage inductance of the transformer, the absorption capability of the absorption circuit 100 corresponding gets weak to reduce the loss and promote the efficiency while ensuring to restrain the voltage peak.

In this embodiment, the absorption circuit 100 correspondingly regulates the absorption capability by detecting the voltage of the transformer primary dotted terminal so that the voltage peak reach the smallest, and the EMI result is the best, and the loss of the feed circuit 300 can be decreased.

In this embodiment, the first electrical switch to the fifth electrical switch Q1-Q5 are NPN type field effect transistors, and control terminals, first terminals and second terminals of the first electrical switch to the fifth electrical switch Q1-Q5 respectively are gates, drains and sources of the field effect transistors. In other embodiments, the first electrical switch to the fifth electrical switch Q1-Q5 also can be transistors of other types.

Figure 4:
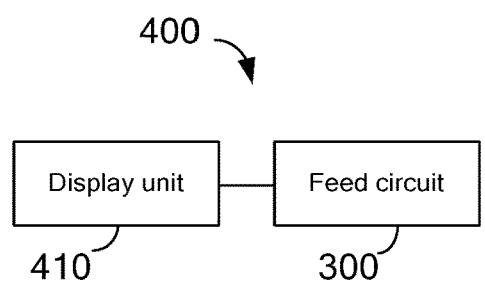
FIG. 4 is a block diagram of a display device provided by the third solution of the present invention.

Please refer to FIG. 4, which is a display device 400 provided by the third solution of the present invention. The display device 400 comprises a display unit 410 and the feed circuit. The feed circuit is the feed circuit provided in the aforesaid feed circuit 300. The specification is:

The feed circuit 300 comprises a transformer T and the absorption circuit 100. The absorption circuit 100 is applied in a feed circuit. The absorption circuit 100 comprises a comparison unit 10 and a regulation unit 20, and the comparison unit 10 is employed to receive a voltage of a transformer primary dotted terminal of the feed circuit, and to compare the voltage with a first preset voltage and a second preset voltage and to output a comparison result, and the regulation unit 20 is employed to regulate a resistor and a capacitor coupled to the transformer according to the comparison result, wherein the first preset voltage is larger than the second preset voltage.

Specifically, the comparison unit 10 compares the voltage with the first preset voltage and the second preset voltage, and three comparison results will appear. The first comparison result is that the voltage is larger than the first preset voltage, and the second comparison result is that the voltage is smaller than the second preset voltage, and the third comparison result is that the voltage is larger than the second preset voltage and smaller than the first preset voltage. The regulation unit 20 regulates three kinds of different resistors and capacitors to be coupled to the transformer according to the first comparison result to the third comparison result, and thus can control the resistor and the capacitor coupled to the transformer according to the leakage inductance (i.e. the voltage) of the transformer, and then adaptively restrain the corresponding voltage peak and EMI (Electro-Magnetic Interference).

Specifically, the comparison unit 10 comprises a first comparator U1, a second comparator U2, a first electric switch Q1 and a first resistor R1, and a non inverting input terminal of the first comparator U1 is coupled to the transformer primary dotted terminal to receive the voltage VA, and an inverting input terminal of the first comparator U1 receives the first preset voltage Vref1, and an output terminal of the first comparator U1 is coupled to the regulation circuit 20, and a non inverting input terminal of the second comparator U2 receives the second preset voltage Vref2, and an inverting input terminal of the second comparator U2 is coupled to the transformer primary dotted terminal to receive the voltage VA, and an output terminal of the second comparator U2 is coupled to a control terminal of the first electrical switch Q1, and a first terminal of the first electrical switch Q1 is coupled to a voltage terminal VCC through the first resistor R1 and coupled to the regulation unit 20, and a second terminal of the first electrical switch Q1 is grounded.

The regulation unit 20 comprises a second electrical switch Q2, a third electrical switch Q3, a fourth electrical switch Q4, a fifth electrical switch Q5, a second resistor R2, a third resistor R3, a fourth resistor R4, a first capacitor C1, a second capacitor C2, a third capacitor C3, and a diode D, a control terminal of the second electrical switch Q2 is coupled to an output terminal of the first comparator U1, and a first terminal of the second electrical switch Q2 is coupled to a transformer primary homonymous terminal through the second resistor R2, and a second terminal of the second electrical switch Q2 is coupled to a cathode of the diode D, and an anode of the diode D is coupled to the transformer primary dotted terminal, and a control end of the third electrical switch Q3 is coupled to the first terminal of the first electrical switch Q1, and a first terminal of the third electrical switch Q3 is coupled to the transformer primary homonymous terminal, and is also coupled to the cathode of the diode D through the third resistor R3, and a second terminal of the third electrical switch Q3 is coupled to the cathode of the diode D, and a control terminal of the fourth electrical switch Q4 is coupled to the output terminal of the first comparator, and a first terminal of the fourth electrical switch Q4 is coupled to the transformer primary homonymous terminal through the first capacitor C1, and a second terminal of the fourth electrical switch Q4 is coupled to the cathode of the diode D, and a control terminal of the fifth electrical switch Q5 is coupled to the first terminal of the first electrical switch Q1, and a first terminal of the fifth electrical switch Q5 is coupled to the transformer primary homonymous terminal through the second capacitor C2, and is also coupled to the cathode of the diode D through the third capacitor C3, and a second terminal of the fifth electrical switch Q5 is coupled to the cathode of the diode D.

Specifically, the voltage of the transformer primary dotted terminal, i.e. the voltage of the A point (the voltage VA) is detected, the larger the leakage inductance of the transformer is, the higher the voltage of the A point becomes, and the EMI result is worse.

As VA>Vref1, the leakage inductance gets large, and the first comparator U1 outputs high voltage level, and the second comparator U2 outputs a low voltage level signal. The second electrical switch to the fifth electrical switch Q2-Q5 are all on, and the resistor coupled to the transformer R=R1/R2 (the first resistor R1 and the second resistor R2 are coupled in parallel), and the capacitor coupled to the transformer C=C1/C2 (the first capacitor C1 and the second capacitor C2 are coupled in parallel). Thus, the capacitor C coupled to the transformer is the largest, and the resistor R coupled to the transformer is the smallest. Thus, the absorption capability of the absorption circuit 100 becomes stronger. Namely, as long with the increase of the leakage inductance of the transformer, the absorption capability of the absorption circuit 100 corresponding gets strong.

As Vref2<VA<Vref1, the leakage inductance is in a normal range, and the first comparator U1 outputs low voltage level, and the second comparator U2 outputs a low voltage level signal. The second electrical switch Q2 and the fourth electrical switch Q4 are off, and the third electrical switch Q3 and the fifth electrical switch Q5 are on, and then the resistor coupled to the transformer R=R2, and the capacitor coupled to the transformer C=C2. Thus, both the capacitor C coupled to the transformer and the resistor R coupled to the transformer are kept to be the original actual values.

As VA<Vref2, the leakage inductance gets small, and the first comparator U1 outputs low voltage level, and the second comparator U2 outputs a high voltage level signal. The second electrical switch to the fifth electrical switch Q2-Q5 are all off, and the resistor coupled to the transformer R=R2 and R3 coupled in series, and the capacitor coupled to the transformer C=C2 and C3 coupled in series. Therefore, the capacitor C coupled to the transformer is the smallest, and the resistor R coupled to the transformer is the largest. Thus, the absorption capability of the absorption circuit 100 becomes weak. Along with the decrease of the leakage inductance of the transformer, the absorption capability of the absorption circuit 100 corresponding gets weak to reduce the loss and promote the efficiency while ensuring to restrain the voltage peak.

In this embodiment, the absorption circuit 100 correspondingly regulates the absorption capability by detecting the voltage of the transformer primary dotted terminal so that the voltage peak reach the smallest, and the EMI result is the best, and the loss of the feed circuit 300 can be decreased, and thus to reduce the loss of the display device 400.

In this embodiment, the first electrical switch to the fifth electrical switch Q1-Q5 are NPN type field effect transistors, and control terminals, first terminals and second terminals of the first electrical switch to the fifth electrical switch Q1-Q5 respectively are gates, drains and sources of the field effect transistors. In other embodiments, the first electrical switch to the fifth electrical switch Q1-Q5 also can be transistors of other types.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. An absorption circuit, applied in a feed circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage.

2. The absorption circuit according to claim 1, wherein the comparison unit comprises a first comparator, a second comparator, a first electric switch and a first resistor, and a non inverting input terminal of the first comparator is coupled to the transformer primary dotted terminal to receive the voltage, and an inverting input terminal of the first comparator receives the first preset voltage, and an output terminal of the first comparator is coupled to the regulation circuit, and a non inverting input terminal of the second comparator receives the second preset voltage, and an inverting input terminal of the second comparator is coupled to the transformer primary dotted terminal to receive the voltage, and an output terminal of the second comparator is coupled to a control terminal of the first electrical switch, and a first terminal of the first electrical switch is coupled to a voltage terminal through the first resistor and coupled to the regulation unit, and a second terminal of the first electrical switch is grounded.

3. The absorption circuit according to claim 2, wherein the regulation unit comprises a second electrical switch, a third electrical switch, a fourth electrical switch, a fifth electrical switch, a second resistor, a third resistor, a fourth resistor, a first capacitor, a second capacitor, a third capacitor, and a diode, a control terminal of the second electrical switch is coupled to an output terminal of the first comparator, and a first terminal of the second electrical switch is coupled to a transformer primary homonymous terminal through the second resistor, and a second terminal of the second electrical switch is coupled to a cathode of the diode, and an anode of the diode is coupled to the transformer primary dotted terminal, and a control end of the third electrical switch is coupled to the first terminal of the first electrical switch, and a first terminal of the third electrical switch is coupled to the transformer primary homonymous terminal, and is also coupled to the cathode of the diode through the third resistor, and a second terminal of the third electrical switch is coupled to the cathode of the diode, and a control terminal of the fourth electrical switch is coupled to the output terminal of the first comparator, and a first terminal of the fourth electrical switch is coupled to the transformer primary homonymous terminal through the first capacitor, and a second terminal of the fourth electrical switch is coupled to the cathode of the diode, and a control terminal of the fifth electrical switch is coupled to the first terminal of the first electrical switch, and a first terminal of the fifth electrical switch is coupled to the transformer primary homonymous terminal through the second capacitor, and is also coupled to the cathode of the diode through the third capacitor, and a second terminal of the fifth electrical switch is coupled to the cathode of the diode.

4. The absorption circuit according to claim 3, wherein the first electrical switch to the fifth electrical switch are NPN type field effect transistors, and control terminals, first terminals and second terminals of the first electrical switch to the fifth electrical switch respectively are gates, drains and sources of the field effect transistors.

5. A feed circuit, comprising a transformer and an absorption circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage.

6. The feed circuit according to claim 5, wherein the comparison unit comprises a first comparator, a second comparator, a first electric switch and a first resistor, and a non inverting input terminal of the first comparator is coupled to the transformer primary dotted terminal to receive the voltage, and an inverting input terminal of the first comparator receives the first preset voltage, and an output terminal of the first comparator is coupled to the regulation circuit, and a non inverting input terminal of the second comparator receives the second preset voltage, and an inverting input terminal of the second comparator is coupled to the transformer primary dotted terminal to receive the voltage, and an output terminal of the second comparator is coupled to a control terminal of the first electrical switch, and a first terminal of the first electrical switch is coupled to a voltage terminal through the first resistor and coupled to the regulation unit, and a second terminal of the first electrical switch is grounded.

7. The feed circuit according to claim 6, wherein the regulation unit comprises a second electrical switch, a third electrical switch, a fourth electrical switch, a fifth electrical switch, a second resistor, a third resistor, a fourth resistor, a first capacitor, a second capacitor, a third capacitor, and a diode, a control terminal of the second electrical switch is coupled to an output terminal of the first comparator, and a first terminal of the second electrical switch is coupled to a transformer primary homonymous terminal through the second resistor, and a second terminal of the second electrical switch is coupled to a cathode of the diode, and an anode of the diode is coupled to the transformer primary dotted terminal, and a control end of the third electrical switch is coupled to the first terminal of the first electrical switch, and a first terminal of the third electrical switch is coupled to the transformer primary homonymous terminal, and is also coupled to the cathode of the diode through the third resistor, and a second terminal of the third electrical switch is coupled to the cathode of the diode, and a control terminal of the fourth electrical switch is coupled to the output terminal of the first comparator, and a first terminal of the fourth electrical switch is coupled to the transformer primary homonymous terminal through the first capacitor, and a second terminal of the fourth electrical switch is coupled to the cathode of the diode, and a control terminal of the fifth electrical switch is coupled to the first terminal of the first electrical switch, and a first terminal of the fifth electrical switch is coupled to the transformer primary homonymous terminal through the second capacitor, and is also coupled to the cathode of the diode through the third capacitor, and a second terminal of the fifth electrical switch is coupled to the cathode of the diode.

8. The feed circuit according to claim 7, wherein the first electrical switch to the fifth electrical switch are NPN type field effect transistors, and control terminals, first terminals and second terminals of the first electrical switch to the fifth electrical switch respectively are gates, drains and sources of the field effect transistors.

9. A display device, comprising a display unit and a feed circuit, and the feed circuit applying power to the display unit, and the feed circuit comprising a transformer and an absorption circuit, wherein the absorption circuit comprises a comparison unit and a regulation unit, and the comparison unit is employed to receive a voltage of a transformer primary dotted terminal of the feed circuit, and to compare the voltage with a first preset voltage and a second preset voltage and to output a comparison result, and the regulation unit is employed to regulate a resistor and a capacitor coupled to the transformer according to the comparison result, wherein the first preset voltage is larger than the second preset voltage.

10. The display device according to claim 9, wherein the comparison unit comprises a first comparator, a second comparator, a first electric switch and a first resistor, and a non inverting input terminal of the first comparator is coupled to the transformer primary dotted terminal to receive the voltage, and an inverting input terminal of the first comparator receives the first preset voltage, and an output terminal of the first comparator is coupled to the regulation circuit, and a non inverting input terminal of the second comparator receives the second preset voltage, and an inverting input terminal of the second comparator is coupled to the transformer primary dotted terminal to receive the voltage, and an output terminal of the second comparator is coupled to a control terminal of the first electrical switch, and a first terminal of the first electrical switch is coupled to a voltage terminal through the first resistor and coupled to the regulation unit, and a second terminal of the first electrical switch is grounded.

11. The display device according to claim 10, wherein the regulation unit comprises a second electrical switch, a third electrical switch, a fourth electrical switch, a fifth electrical switch, a second resistor, a third resistor, a fourth resistor, a first capacitor, a second capacitor, a third capacitor, and a diode, a control terminal of the second electrical switch is coupled to an output terminal of the first comparator, and a first terminal of the second electrical switch is coupled to a transformer primary homonymous terminal through the second resistor, and a second terminal of the second electrical switch is coupled to a cathode of the diode, and an anode of the diode is coupled to the transformer primary dotted terminal, and a control end of the third electrical switch is coupled to the first terminal of the first electrical switch, and a first terminal of the third electrical switch is coupled to the transformer primary homonymous terminal, and is also coupled to the cathode of the diode through the third resistor, and a second terminal of the third electrical switch is coupled to the cathode of the diode, and a control terminal of the fourth electrical switch is coupled to the output terminal of the first comparator, and a first terminal of the fourth electrical switch is coupled to the transformer primary homonymous terminal through the first capacitor, and a second terminal of the fourth electrical switch is coupled to the cathode of the diode, and a control terminal of the fifth electrical switch is coupled to the first terminal of the first electrical switch, and a first terminal of the fifth electrical switch is coupled to the transformer primary homonymous terminal through the second capacitor, and is also coupled to the cathode of the diode through the third capacitor, and a second terminal of the fifth electrical switch is coupled to the cathode of the diode.

12. The display device according to claim 11, wherein the first electrical switch to the fifth electrical switch are NPN type field effect transistors, and control terminals, first terminals and second terminals of the first electrical switch to the fifth electrical switch respectively are gates, drains and sources of the field effect transistors.

* * * * *